United States Patent
Riser et al.

(10) Patent No.: US 6,196,709 B1
(45) Date of Patent: Mar. 6, 2001

(54) TROUGH REFLECTOR AND LENS COUPLER FOR LIGHTGUIDE ILLUMINATION SYSTEM

(75) Inventors: Andrew P. Riser, Newbury, OH (US); Ronald Rykowski, Woodinville, WA (US)

(73) Assignee: Remote Source Lighting International, Inc.

( * ) Notice: Subject to any disclaimer, the term of this patent is extended or adjusted under 35 U.S.C. 154(b) by 0 days.

(21) Appl. No.: 09/239,559

(22) Filed: Jan. 29, 1999

Related U.S. Application Data

(60) Provisional application No. 60/073,054, filed on Jan. 29, 1998.

(51) Int. Cl.$^7$ ............................................. F21V 8/00
(52) U.S. Cl. ........................... 362/551; 362/297; 362/346
(58) Field of Search .................................. 362/268, 297, 362/346, 551, 552, 559, 560, 298; 385/33, 39, 47

(56) References Cited

U.S. PATENT DOCUMENTS

| | | | |
|---|---|---|---|
| 4,039,816 | * 8/1977 | Gareis | 362/551 |
| 4,194,234 | * 3/1980 | Geissler | 362/297 |
| 4,459,643 | 7/1984 | Mori . | |
| 5,117,312 | 5/1992 | Dolan . | |
| 5,222,793 | * 6/1993 | Davenport et al. | 362/346 |
| 5,751,870 | 5/1998 | Forkner et al. . | |

* cited by examiner

Primary Examiner—Y. Quach
(74) Attorney, Agent, or Firm—Stout, Uxa, Buyan & Mullins, LLP; Donald E. Stout

(57) ABSTRACT

A lightguide illumination system is disclosed for providing more improved and efficient technology for capturing light from an extended light source having a relatively high aspect ratio, and coupling that light into a plurality of lightguides. The inventive systems functions by dividing the length of the extended light source into shorter segments, so that the aspect ratio of the light source can be more closely matched to the aspect ratio of the lightguide. In the preferred embodiment, a plurality of interleaved trough reflector segments are employed to segment the length of the light source. This enables the coupling efficiency of the total system to be greatly improved.

13 Claims, 1 Drawing Sheet

TROUGH REFLECTOR AND LENS COUPLER FOR LIGHTGUIDE ILLUMINATION SYSTEM

This application claim benefit to Provisional application Ser. No. 60/073,054 filed Jan. 29, 1998.

FIELD OF THE INVENTION

The present invention relates to optical light guide illumination systems, and more particularly to optical light guide illumination systems employing improved and more efficient technology for capturing light from an extended source and coupling that light into a plurality of light guides.

BACKGROUND OF THE INVENTION

In optical illumination systems, it is desirable to couple light from an illumination source (typically a lamp) into a light guide, or a plurality of light guides, as efficiently as possible. As the coupling efficiency improves, manufacturing and operating costs decline. When evaluating the coupling efficiency from any illumination source into any particular light guide, the designer must consider the size (and aspect ratio) and numerical aperture of both the source and the light guide. For optimum coupling, the image of the lamp on the light guide surface should match as closely as possible the spatial geometry and numerical aperture of the light guide.

High intensity white light sources used in illumination applications are typically extended sources (as opposed to point sources), because they have a finite illuminating element. The emitting surface cross-section is much greater than the cross-section of typical light guides. In addition, many lamps may be considered Lambertian or Quasi-Lambertian radiators. For such lamps, the radiation profile (far-field pattern) far exceeds the numerical aperture of the light guide. Since the numerical aperture and core cross-section of the light guide are both substantially smaller than the corresponding elements of the illumination source, it is impossible to efficiently couple the light into a single light guide. Consequently, a plurality of light guides must be placed at the output of the optical system in order to collect the light that exceeds the core cross-section and numerical aperture of a single light guide.

In addition to the near-field and far-field mismatch conditions between a lamp and a light guide, further geometric issues complicate source to light guide coupling efficiency. Since these illumination sources exhibit large aspect ratios, typically between 5:1 and 20:1, then the near-field conditions of the lamp and the light guide are not easily matched (since light guides generally have an aspect ratio of one). If the entire image of the lamp is focused on the light guide end, then the light guide is greatly underfilled (spatially) in one dimension. If the image size is increased to match the minor axis of the image to the diameter of the light guide, ten the major axis of the image will greatly overfill the light guide. In either case, the coupling efficiency is not optimized.

Current multi-light guide couplers are designed to divide the radiation profile of extended illumination sources by placing a plurality of lenses around the source. Each lens collects only the solid angle of light emanated from the illumination source which can be accepted by the light guide; i.e. a solid angle less than or equal to the numerical aperture of the light guide.

A conventional way to launch light into a light guide is to focus the light onto the light guide end using a lens. This generally involves imaging the entire source as seen from the perspective of the lens. This technique can be very effective if the aspect ratio of the source is a close match to the aspect ratio of the light guide, or if the source is sufficiently small relative to the size of the light guide. However, if there is a large difference in aspect ratio, such as is the case for a high-pressure sodium lamp, which is long and narrow, then this brings about a loss of efficiency due to the mismatched geometry.

SUMMARY OF THE INVENTION

The present invention resolves the difficulties discussed supra, by dividing the length of the light source into shorter segments, so that the aspect ratio of the light source can be more closely matched to the aspect ratio of the light guide. This enables the coupling efficiency of the total system to be improved.

More particularly, in the inventive system the illumination source's radiation profile, and its emitting surface, are both divided by a reflective optical system to enhance the spatial and solid angle match between the lamp and the light guide. With this inventive technique, the coupling between a lamp and a light guide are optimized. The reflective optical system comprises a plurality of troughs in a reflector, which together divide the major axis of the emitting surface of the illumination source. In this manner, the effective source aspect ratio can be imaged onto each light guide and can be optimized to match the light guide's spatial geometry, which is generally circular. In addition, the radius of curvature of the reflector and coupling lens is chosen to match the numerical aperture of the light guides placed at the output of the lens system. In this manner, the source coupling efficiency is optimized.

Using the inventive technique, each light guide has a part of the source dedicated to it. This is a significant difference from the common state-of-the-art technique where the entire source is shared with many light guides. The invention provides more design freedom to optically couple high aspect ratio sources with light guides in an efficient manner.

In one particular aspect of the invention, an illumination system is provided which comprises an illumination source having an illumination emitting surface wherein the emitting surface has a longer dimension and a shorter dimension, so that its aspect ratio is substantially greater than one, and preferably greater than about three. Also included in the system are a plurality of reflector segments disposed adjacent to the illumination source, which are arranged to divide the emitting surface along its longer dimension into a plurality of sections. As a result of this inventive configuration, light emitted from each section of the emitting surface is directed to a different corresponding one of the plurality of reflector segments. The inventive system also comprises a plurality of light guides which have receiving ends for receiving light distributed from different corresponding ones of the plurality of reflector segments.

In another aspect of the invention, an illumination system is provided which comprises an illumination source having an illumination emitting surface, which has a longer dimension and a shorter dimension, so that its aspect ratio is substantially greater then one. Also included in the inventive system are a plurality of trough-like reflector segments disposed adjacent to the illumination source, which are interleaved to divide the emitting surface along its longer dimension into a plurality of sections, so that light emitted from each section of the emitting surface is directed to a different corresponding one of the plurality of reflector segments. A plurality of lenses having a one-to-one correspondence to the plurality of reflector segments are arranged so that respective ones of the lenses receive light reflected from corresponding ones of the reflector segments. Additionally, a plurality of light guides having a one-to-one correspondence to the plurality of lenses are provided and are arranged so that a receiving end of each of the light guides receives light distributed from a corresponding one of the plurality of lenses.

In still another aspect of the invention, there is disclosed a method for distributing light from an illumination source having an aspect ratio substantially greater than one to a plurality of light guides. This method comprises the steps of dividing a longer dimension (i.e. the length) of the illumination source into a plurality of sections, receiving light from each section of the illumination source on a corresponding reflector segment, and reflecting the light onto a receiving end of a light guide.

The invention, together with additional features and advantages thereof, may best be understood by reference to the following description taken in conjunction with the accompanying illustrative drawing.

DESCRIPTION OF THE PREFERRED EMBODIMENT

Figure 1:
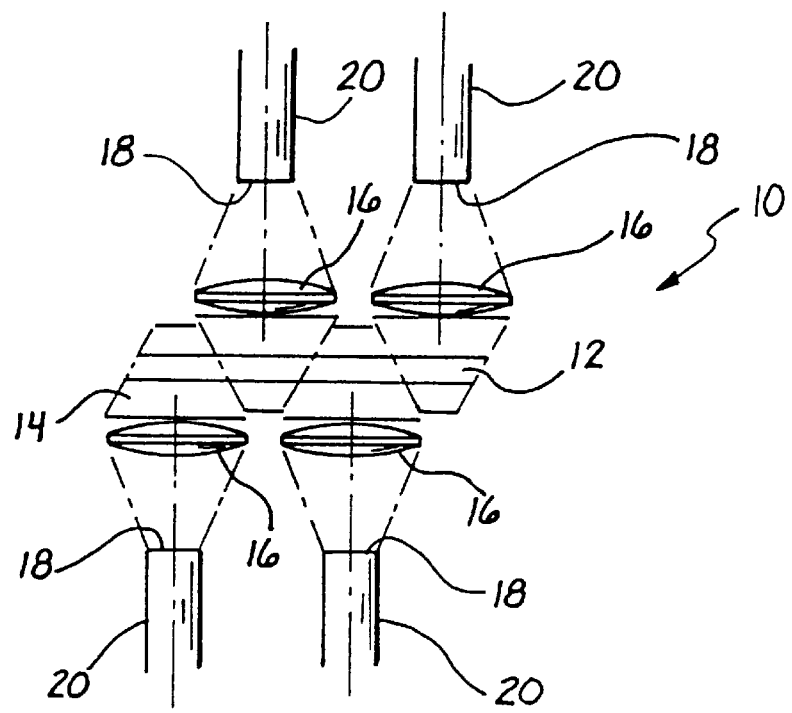
FIG. 1 is a schematic top view of an optical light guide illumination system constructed in accordance with the principles of the invention.
Figure 2:
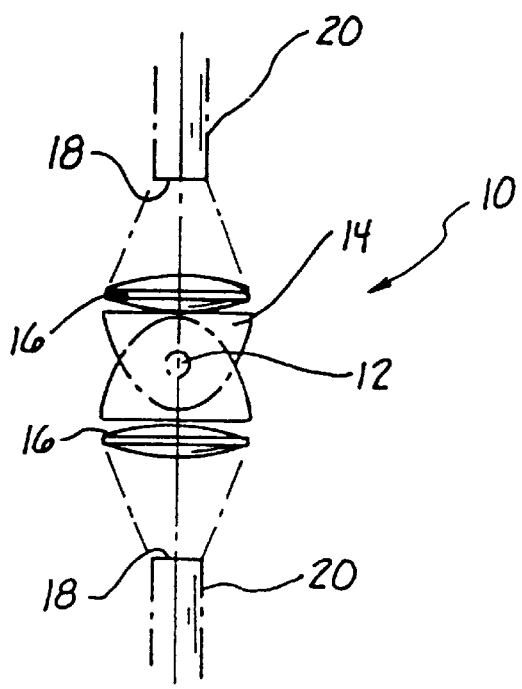
FIG. 2 is a schematic side view of the optical light guide illumination system illustrated in FIG. 1.

With reference now particularly to the drawing figures, an optical illumination system 10 is shown which is comprised of an extended illumination source 12. The illumination source 12 may be any known lamp having a relatively high aspect ratio; for example about 15:1. The inventive construction will accommodate illumination sources having aspect ratios ranging from about 3:1 or higher, but is particularly advantageous for sources with higher aspect ratios, wherein other coupling methods are generally unsuitable.

In order to divide the length of the illumination source 12 into smaller lengths, in accordance with the principles of the invention, a plurality of trough-type reflector segments 14 (which may comprise either a single reflector having a plurality of troughs 14 or a plurality of separate reflectors, each of which comprises a single trough 14) are interleaved as illustrated in FIG. 1 so that nearly all of the light from each section of the illumination source is captured by a trough-type reflector segment corresponding to that section and fed into a corresponding lens 16 which focuses the light onto a receiving end 18 of a corresponding light guide 20. The light is then transmitted along the length of the light guide for the desired illumination application.

Preferably, the number of trough-type reflector segments equals the number of lenses and the number of light guides, though it is feasible to design systems where that is not the case. For illumination sources having larger aspect ratios, the quantity of reflective troughs may be increased as required to collect light from each segment of the source. The general design principle is to keep each segment relatively small and increase the number of segments, rather than increasing the length of the segments as the length of the illumination source increases. The fraction of the emitting surface imaged onto any one light guide is determined by the number of trough segments wrapped around the source, as shown in FIG. 1. The number of trough segments may be optimized to accommodate lamps of various dimensions and aspect ratios.

The inventive technique is advantageous in that it permits the system designer to adjust illumination source size and shape to the optimum for a given light guide diameter and numerical aperture. In this way, the designer is able to make improvements beyond what the traditional state of the art methods will allow.

While this invention has been described with respect to various specific examples and embodiments, it is to be understood that the invention is not limited thereto and that it can be variously practiced within the scope of the following claims.

What is claimed is:

1. An illumination system comprising:
   an illumination source comprising an illumination emitting surface having a longer dimension and a shorter dimension, so that the illumination source's aspect ratio is substantially greater than one;
   a plurality of reflector segments disposed adjacent to the illumination source, and being arranged so that said reflector segments are interleaved with one another, in opposing orientations, along the longer dimension of said illumination emitting surface; and
   a plurality of light guides having receiving ends for receiving light distributed from different corresponding ones of said plurality of reflector segments.

2. The illumination system as recited in claim 1, wherein said plurality of reflector segments comprise a single segmented reflector.

3. The illumination system as recited in claim 1, wherein said plurality of reflector segments comprise separate reflectors.

4. The illumination system as recited in claim 1, wherein each of said reflector segments comprises a trough.

5. The illumination system as recited in claim 1, and further comprising a plurality of lenses interposed between said reflector segments and said light guides, for focusing light from said reflector segments onto the receiving ends of said light guides.

6. The illumination system as recited in claim 5, wherein there is a one-to-one correspondence of reflector segments to lenses, and of lenses to light guides.

7. The illumination system as recited in claim 1, wherein said longer dimension comprises a length of said illumination source.

8. The illumination system as recited in claim 1, wherein the aspect ratio of the illumination source is at least about 3:1.

9. The illumination system as recited in claim 1, wherein the aspect ratio of the illumination source at least about 15:1.

10. An illumination system comprising:
    an illumination source comprising an illumination emitting surface having a longer dimension and a shorter dimension, so that the illumination source's aspect ratio is substantially greater than one;
    a plurality of trough-like reflector segments disposed adjacent to the illumination source, and being interleaved so that each reflector segment receives light emitted from a different corresponding one of a plurality of sections of said emitting surface, wherein said plurality of sections taken together comprise substantially the entire longer dimension of said emitting surface;

a plurality of lenses having a one-to-one correspondence to said plurality of reflector segments, and being arranged so that respective ones of said lenses receive light reflected from corresponding ones of said reflector segments; and a plurality of light guides having a one-to-one correspondence to said plurality of lenses, and being arranged so that a receiving end of each of said light guides receives light distributed from a corresponding one of said plurality of lenses.

11. A method for distributing light from an illumination source having an aspect ratio substantially greater than one to a plurality of lightguides, said method comprising the steps of:

a) disposing a plurality of reflector segments adjacent to said illumination source in an interleaved fashion in opposing orientations, such that each of said plurality of reflector segments is adapted to receive light only from a corresponding section of a longer dimension of said illumination source;

b) receiving light from each said section of said illumination source only onto its corresponding reflector segment; and c) reflecting said light onto a receiving end of a light guide.

12. The method of claim 11, wherein each reflector segment is trough-like.

13. The method of claim 11, wherein step c) includes the step of reflecting the light from each illumination source section onto a corresponding lens, which in turn focuses the light onto the receiving end of a corresponding light guide.

* * * * *